(12) United States Patent
Von Bochmann et al.

(10) Patent No.: US 10,262,065 B2
(45) Date of Patent: Apr. 16, 2019

(54) HYBRID TASK ASSIGNMENT

(71) Applicant: INTERNATIONAL BUSINESS MACHINES CORPORATION, Armonk, NY (US)

(72) Inventors: Gregor Von Bochmann, Ottawa (CA); Guy-Vincent R. Jourdan, Ottawa (CA); Iosif V. Onut, Ottawa (CA); Seyed M. Mir Taheri, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 14/550,229

(22) Filed: Nov. 21, 2014

(65) Prior Publication Data

US 2015/0178389 A1    Jun. 25, 2015

(30) Foreign Application Priority Data

Dec. 24, 2013   (CA) ..................................... 2838104

(51) Int. Cl.
*G06F 17/30*     (2006.01)
(52) U.S. Cl.
CPC ............................. *G06F 17/30864* (2013.01)
(58) Field of Classification Search
CPC combination set(s) only.
See application file for complete search history.

(56) References Cited

U.S. PATENT DOCUMENTS

| | | | | |
|---|---|---|---|---|
| 6,182,085 | B1* | 1/2001 | Eichstaedt | ............ G06F 9/5083 |
| 7,062,561 | B1* | 6/2006 | Reisman | ................. G06F 17/30 |
| | | | | 707/E17.109 |
| 7,139,747 | B1 | 11/2006 | Najork | |
| 7,461,155 | B2* | 12/2008 | Reisman | ................. G06F 17/30 |
| | | | | 707/E17.109 |
| 8,255,541 | B2* | 8/2012 | Reisman | ................. G06F 17/30 |
| | | | | 709/203 |

(Continued)

OTHER PUBLICATIONS

Fu, Weiwei, Tianzhou Chen, Chao Wang, and Li Liu. "Optmzng memory access traffc va runtme thread mgraton for on-chp dstrbuted memory systems." The Journal of Supercomputing 69, No. 3 (2014): 1491-1516.*

(Continued)

*Primary Examiner* — Farhan M Syed
(74) *Attorney, Agent, or Firm* — Law Office of Jim Boice

(57) ABSTRACT

A computer-implemented method for hybrid task assignment is presented. A working hardware node crawls a particular application and encounters a task. A mapping function is used to determine whether the task encountered is reserved. In response to a determination the task encountered is not reserved, the task is handled by the working node, and in response to a determination the task encountered is reserved, the task encountered is sent to a central unit. A determination is made as to whether the working node is idle. In response to a determination the working node is idle, another task is requested from the central unit by the working node. In response to a determination the working node is not idle, as determination is made as to whether all tasks are complete. In response to a determination all tasks are not complete, the task is handled by the working node.

19 Claims, 8 Drawing Sheets

(56) References Cited

U.S. PATENT DOCUMENTS

| | | | |
|---|---|---|---|
| 9,015,093 B1* | 4/2015 | Commons | G01C 21/3602 706/26 |
| 2004/0003022 A1 | 1/2004 | Garrison et al. | |
| 2006/0167862 A1* | 7/2006 | Reisman | G06F 17/30 |
| 2009/0119286 A1* | 5/2009 | Reisman | G06F 17/30 |
| 2009/0254572 A1* | 10/2009 | Redlich | G06Q 10/06 |
| 2011/0307467 A1 | 12/2011 | Severance | |

OTHER PUBLICATIONS

Dhok, Jaideep Datta. "Learning based admission control and task assignment in MapReduce." PhD diss., International Institute of Information Technology Hyderabad, 2010. pp. i-93 (107 total pages).*

S. Zhong et al, "A Web Crawler System Design Based on Distributed Technology," Academy Publisher, Journal of Networks, vol. 6, No. 12, Dec. 2011, pp. 1682-1689.

B. Cambazoglu et al., "On the Feasibility of Geographically Distributed Web Crawling," ICST, Proceedings of the 3rd International Conference on Scalable Information Systems, 2008, Article No. 31, pp. 1-10.

M. Nasri et al., "Load Balancing Using Consistent Hashing: A Real Challenge for Large Scale Distributed Web Crawlers," IEEE, International Conference on Advanced Information Networking and Applications Workshops, 2009, pp. 715-720. (Abstract Only).

P. Boldi, et al., "Ubicrawler: A scalable fully distributed web crawler", Software: Practice & Experience, 34:2004, 2002, pp. 1-14.

S. Brin, et al., "The anatomy of a large-scale hypertextual web search engine", In Proceedings of the seventh international conference on World Wide Web 7, WWW7, pp. 107-117, Amsterdam, The Netherlands, 1998. Elsevier Science Publishers B. V.

J. Cho et al., "Parallel crawlers", ACM, WWW2002, Technical Report 2002-9, Stanford InfoLab, Feb. 2002, pp. 1-13.

D. Chau et al., "Parallel crawling for online social networks", In Proceedings of the 16th international conference on World Wide Web, WWW '07, pp. 1283-1284, New York, NY, USA, 2007, ACM.

J. Exposto et al., "Efficient Partitioning Strategies for Distributed Web Crawling", Springer-Verlag, Information Networking: Toward Ubiquitous Networking and Services, 2008, pp. 544-553. (Abstract Only)

B. Loo, et al., "Distributed web crawling over DHTs", Technical Report UCB/CSD-04-1305, EECS Department, University of California, Berkeley, 2004, pp. 1-11.

C. Olston et al., "Web Crawling", Foundations and Trends in Information Retrieval, vol. 4, No. 3, 2010, pp. 175-246.

* cited by examiner

HYBRID TASK ASSIGNMENT

BACKGROUND

This disclosure relates generally to web crawling in a data processing system and more specifically to task assignment for web crawling in the data processing system.

Known prior art describes designing efficient ways to crawl websites and web applications in a distributed environment, which has been the topic of extensive research for over 20 years. Many efficient and scalable solutions are offered using distributed platforms. At the core of a distributed crawling algorithm is a partitioning algorithm through which a mapping function is used by crawlers to determine to avoid or reduce duplication of work among the crawlers while performing required tasks. A task is often visiting a page and performing some computation on the page visited, for example crawling for indexing or crawling to perform security testing. Known prior art states that two main categories of partitioning algorithms are static assignment and dynamic.

Static assignment is an approach in which each worker in a set of homogeneous workers is each allocated a unique ID. The mapping function maps each task to one of the unique assigned IDs in the system. Upon encountering a task a crawler examines the task and decides whether the task falls under jurisdiction of the crawler or the task belongs to another node. When the task falls under jurisdiction of the crawler, the node takes care of the task autonomously. When the task does not fall under jurisdiction of the crawler, the current node informs the node responsible for the task.

Different proposals suggest different matrices and algorithms to derive the mapping function. Typical approaches use parameters including a hash of the universal resource locator (URL), a geographical location of the server, and a URL hierarchy. Further, different approaches represent different trade-offs between overhead associated with duplication of work and use of communication by known prior art.

Dynamic assignment is another approach in which one or more centralized control units track discovered tasks and executed tasks. Upon discovering a task, each node informs the centralized control units which add the discovered task to their respective queues. Known prior art shows that during crawling, all nodes constantly ask the centralized control units for workload.

Known prior art roughly follows the architecture in which a centralized unit called a URL server stores a list of URLs and orders a set of slave nodes to download each URL. All downloaded pages are stored in a unit called store server. The retrieved pages then are indexed in a distributive manner. Known prior art shows that downloading tasks and the indexing tasks require centralized units of coordination.

There also exists a third category in which nodes work independently without any coordination and task partitioning. Known prior art algorithms in this category typically either do not guarantee the full coverage of tasks, or may suffer from work duplication.

With reference to FIG. 1 a communication pattern and work assignment of a static assignment model is illustrated. A set of nodes 100 comprises nodes 102-110 in which each node has a communication path to each other node in set of nodes 100. Each node is therefore capable of exchanging information with each other node in the set. The communication links become more complex as the number of nodes in the set of nodes increases. Network traffic typically becomes an issue as the number of nodes increases. Although nodes 102-110 are shown, the number of nodes is not limited to five and can be extended to n number of nodes as needed and within resources available.

With reference to FIG. 2 a communication pattern and work assignment representative of a dynamic assignment model is presented. Set of nodes 200 comprises nodes 202-210 and central unit 212. Each node in set of nodes 200 communicates with central unit 212. Traffic between nodes does not occur as in set of nodes 100 of FIG. 1. Each node in set of nodes 200 relies on central unit 212 for assignment of tasks. Although nodes 202-210 are shown, the number of nodes is not limited to five and can be extended to n number of nodes as needed.

Dynamic assignment of tasks, as in FIG. 2, creates a natural and typically load balanced policy, in the process, because working nodes only ask for new workload when the working nodes are free, thus no working node becomes a bottleneck. Static assignment of tasks, however, may lead to one node or a set of nodes becoming a bottleneck. Theoretically randomization created by good mapping functions can distribute tasks equally among the workers. Practically however indeterministic behavior of a system created by factors including network delays, operating system scheduler, and server respond time increases this gap. Newly emerging technologies such as cloud environment and heterogeneous computing increase the difficulty in creating a correct mapping function to achieve ideal load balancing.

Static assignment of tasks, as in FIG. 1, enjoys a peer-to-peer architecture, which helps to avoid any single unit becoming a bottleneck and therefore provides an opportunity for a scalable solution. The dynamic assignment approach, as in FIG. 2, requires central units to track all discovered tasks and visited tasks. The central units can accordingly become bottlenecks and lead to scalability issue.

SUMMARY

In an embodiment of the present disclosure, a computer-implemented method for hybrid task assignment comprises: crawling, by a working hardware node, a particular application; encountering, by the working hardware node, a task; using a mapping function to determine whether the task encountered is reserved; selectively handling, by one or more processors, the task according to whether the task is reserved, wherein in response to a determination the task encountered is not reserved, the task is handled by the working node, and wherein in response to a determination the task encountered is reserved, the task encountered is sent to a central unit; determining whether the working hardware node is idle; selectively responding to whether the working hardware node is idle, wherein in response to a determination the working hardware node is idle, requesting another task from the central unit by the working hardware node, and wherein in response to a determination the working hardware node is not idle, determining whether all tasks are complete; and in response to a determination all tasks are not complete, handling the task by the working hardware node.

In an embodiment of the present disclosure, a computer program product for hybrid task assignment is presented. The computer program product comprises a computer readable storage medium having program code embodied therewith, wherein the computer readable storage medium is not a transitory signal per se, and wherein the program code is readable and executable by a processor to perform a method comprising: crawling a particular application, by a working hardware node; encountering a task by the working hardware node; determining whether the task encountered is reserved, using a mapping function; in response to a determination the task encountered is not reserved, for handling the task by the working hardware node; in response to a determination the task encountered is reserved, for sending the task encountered to a central unit; determining whether the working hardware node is idle; in response to a determination the working hardware node is idle, for requesting another task from the central unit by the working hardware node; in response to a determination the working hardware node is not idle, for determining whether all tasks are complete; and in response to a determination all tasks are not complete, for handling the task by the working hardware node.

In an embodiment of the present disclosure, an apparatus for hybrid task assignment comprises: a communications fabric; a memory connected to the communications fabric, wherein the memory contains computer executable program code; a communications unit connected to the communications fabric; an input/output unit connected to the communications fabric; a display connected to the communications fabric; and a processor unit connected to the communications fabric, wherein the processor unit executes the computer executable program code to direct the apparatus to: crawl a particular application, by a working hardware node; encounter a task by the working hardware node; determine whether the task encountered is reserved, using a mapping function; in response to a determination the task encountered is not reserved, handle the task by the working hardware node; in response to a determination the task encountered is reserved, send the task encountered to a central unit; determine whether the working hardware node is idle; in response to a determination the working node is idle, request another task from the central unit by the working hardware node; in response to a determination the working hardware node is not idle, determine whether all tasks are complete; and in response to a determination all tasks are not complete, handle the task by the working hardware node.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
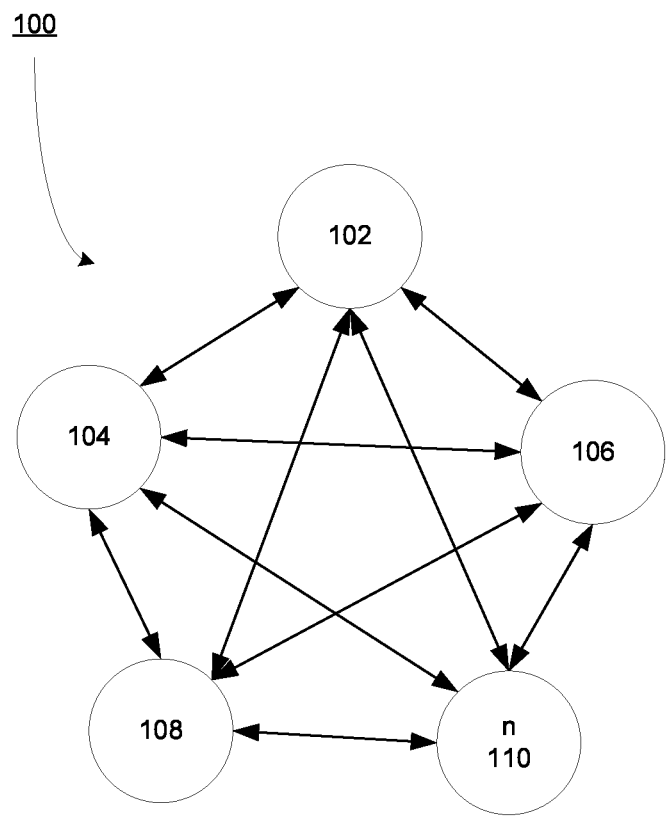
FIG. 1 depicts a communication pattern and work assignment of a static assignment model.
Figure 2:
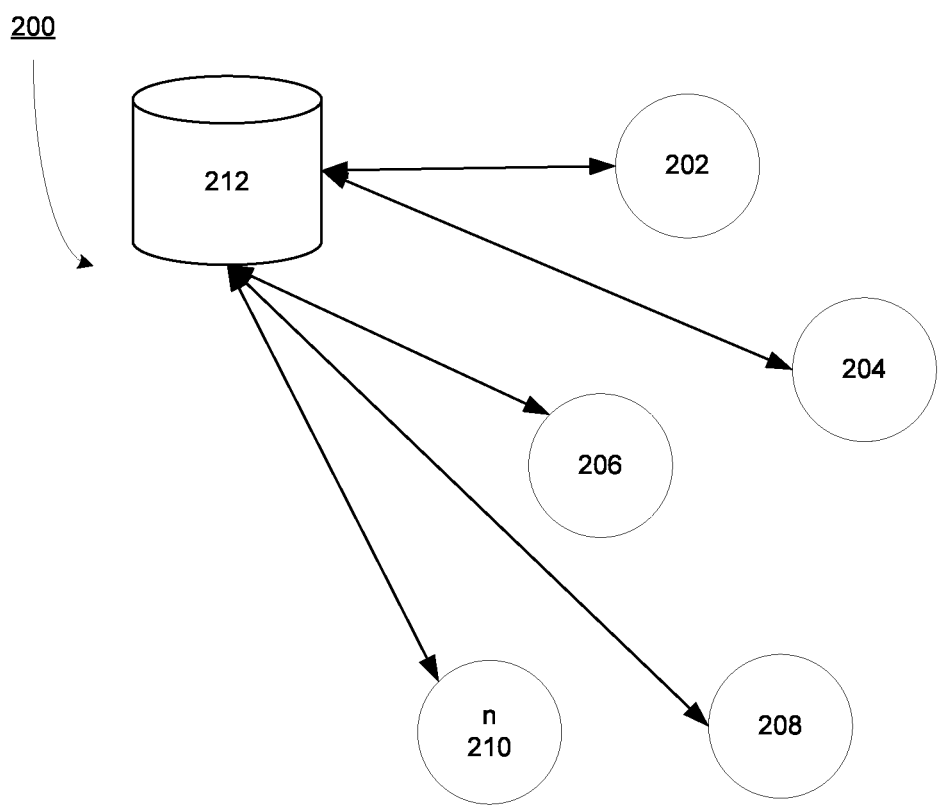
FIG. 2 depicts a communication pattern and work assignment representative of a dynamic assignment model.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
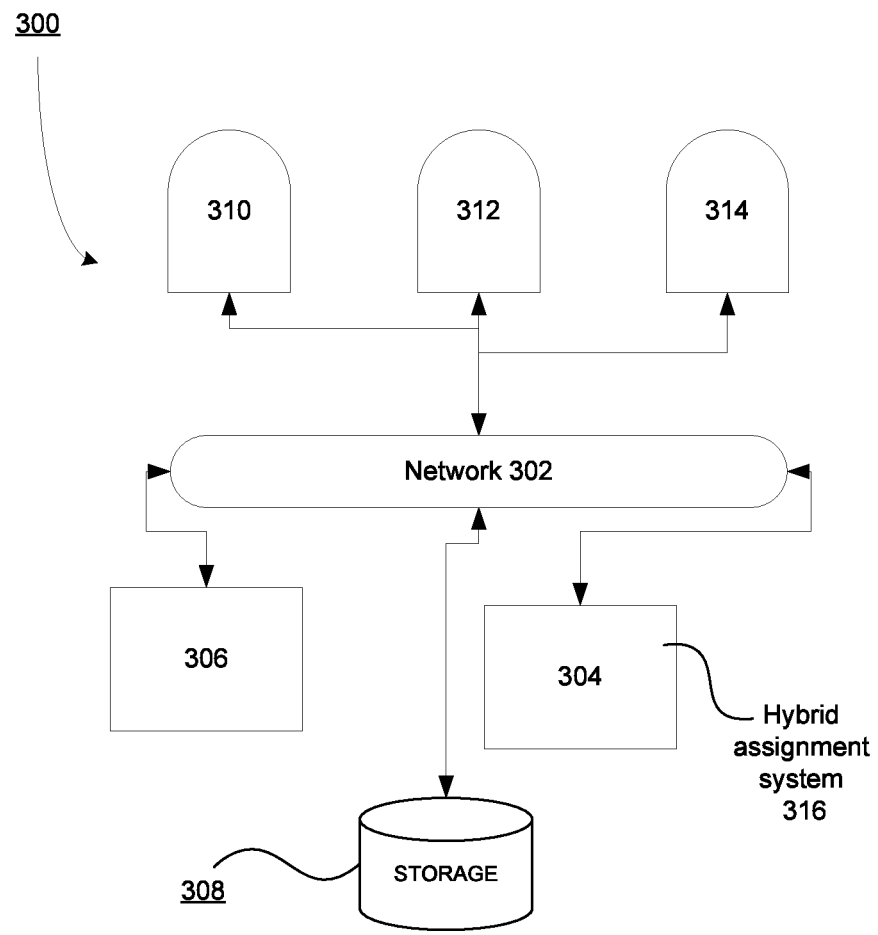
FIG. 3 is a block diagram of an exemplary network data processing system operable for various embodiments of the disclosure.
Figure 4:
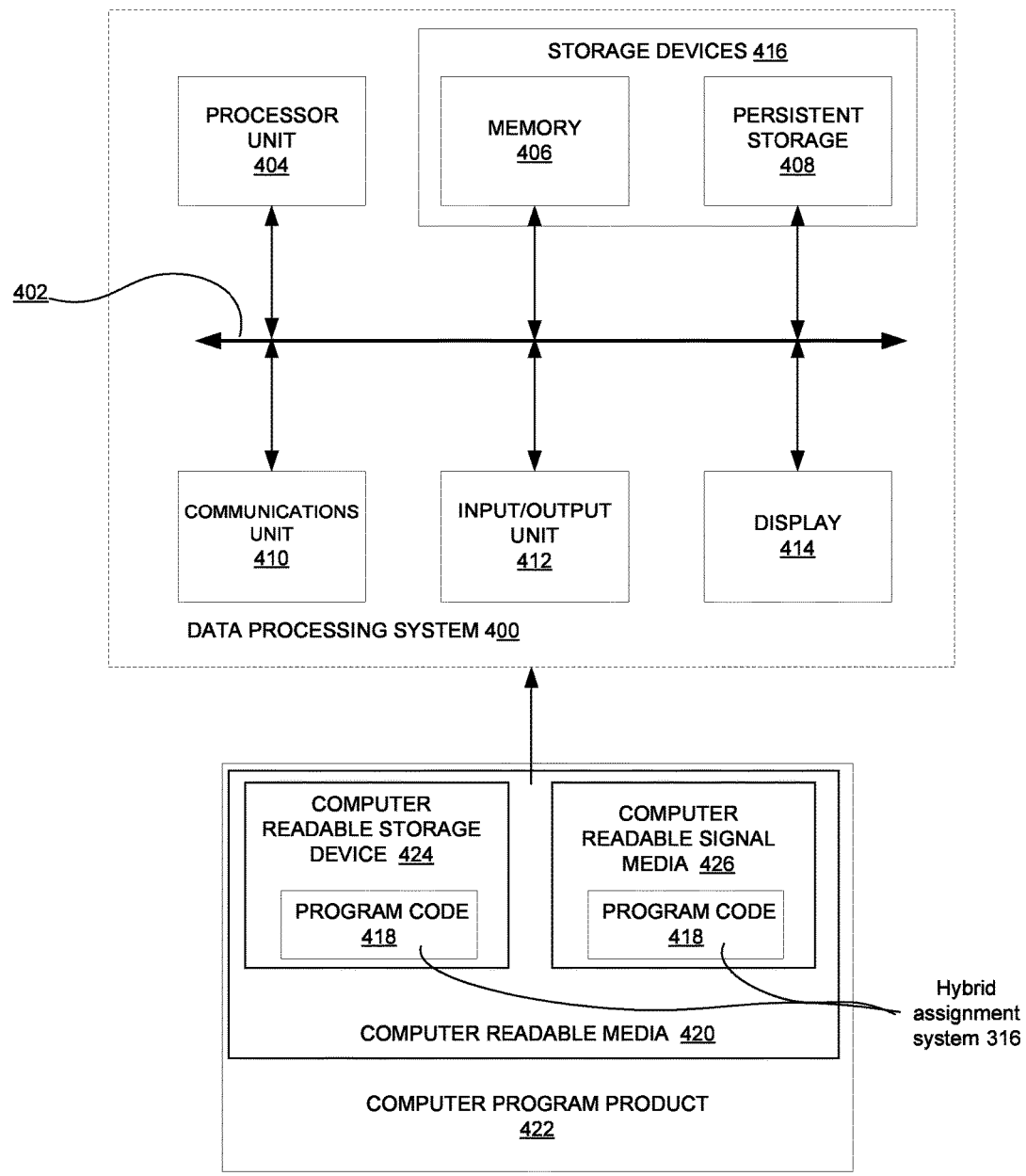
FIG. 4 is a block diagram of an exemplary data processing system operable for various embodiments of the disclosure.

With reference now to the figures and in particular with reference to FIGS. 3 and 4, exemplary diagrams of data processing environments are provided in which illustrative embodiments may be implemented. It should be appreciated that FIGS. 3 and 4 are only exemplary and are not intended to assert or imply any limitation with regard to the environments in which different embodiments may be implemented. Many modifications to the depicted environments may be made.

With reference to FIG. 3 a pictorial representation of a network of data processing systems in which illustrative embodiments of a hybrid assignment system according to the disclosure may be implemented is presented. Network data processing system 300 is a network of computers in which the illustrative embodiments may be implemented. Network data processing system 300 contains network 302, which is the medium used to provide communications links between various devices and computers connected together within network data processing system 300. Network 302 may include connections, such as wire, wireless communication links, or fiber optic cables.

In the depicted example, server 304 and server 306 connect to network 302 along with storage unit 308. In addition, clients 310, 312, and 314 connect to network 302. Clients 310, 312, and 314 may be, for example, personal computers or network computers. In the depicted example, server 304 provides data, such as boot files, operating system images, and applications to clients 310, 312, and 314. In addition, server 304 provides a capability of hybrid assignment system 316 to server 306 and to clients 310, 312, and 314 through connections to network 302. Clients 310, 312, and 314 are clients to server 304 in this example. Network data processing system 300 may include additional servers, clients, and other devices not shown.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 300 also may be implemented as a number of different types of networks, such as for example, an intranet, a local area network (LAN), or a wide area network (WAN). FIG. 3 is intended as an example, and not as an architectural limitation for the different illustrative embodiments.

With reference to FIG. 4 a block diagram of an exemplary data processing system operable for various embodiments of the disclosure is presented. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example without limitation, data, program code in functional form, and/or other suitable information either on a temporary basis and/or a permanent basis. Memory 406, in these examples, may be, for example, a random access memory or any other suitable volatile or non-volatile storage device. Persistent storage 408 may take various forms depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications and/or programs may be located in storage devices 416, which are in communication with processor unit 404 through communications fabric 402. In these illustrative examples the instructions are in a functional form on persistent storage 408. These instructions may be loaded into memory 406 for execution by processor unit 404. The processes of the different embodiments may be performed by processor unit 404 using computer-implemented instructions, which may be located in a memory, such as memory 406.

These instructions are referred to as program code, computer usable program code, or computer readable program code that may be read and executed by a processor in processor unit 404. The program code in the different embodiments may be embodied on different physical or tangible computer readable storage medium, such as memory 406 or persistent storage 408.

Program code 418 is located in a functional form on computer readable media 420 that is selectively removable and may be loaded onto or transferred to data processing system 400 for execution by processor unit 404. Program code 418 also contains program code representative of hybrid assignment system 316 of FIG. 3. Program code 418 and computer readable media 420 form computer program product 422 in these examples. In one example, computer readable media 420 may be in a tangible form, such as, for example, an optical or magnetic disc that is inserted or placed into a drive or other device that is part of persistent storage 408 for transfer onto a storage device, such as a hard drive that is part of persistent storage 408. In a tangible form, computer readable media 420 also may take the form of persistent storage as a computer readable storage device 424, such as a hard drive, a thumb drive, or a flash memory that is connected to data processing system 400. The tangible form of computer readable storage media 420 is also referred to as computer recordable storage media or a computer readable data storage device. In some instances, computer readable media 420 may not be removable. The computer recordable storage media or a computer readable data storage device does not encompass propagation media such as that of computer readable signal media 426.

Alternatively, program code 418 may be transferred to data processing system 400 from computer readable media 420 through a communications link to communications unit 410 and/or through a connection to input/output unit 412. The communications link and/or the connection may be physical or wireless in the illustrative examples.

In some illustrative embodiments, program code 418 may be downloaded over a network to persistent storage 408 from another device or data processing system for use within data processing system 400. For instance, program code stored in a computer readable data storage device in a server data processing system may be downloaded over a network from the server as computer readable signal media 426 to data processing system 400. The data processing system providing program code 418 may be a server computer, a client computer, or some other device capable of storing and transmitting program code 418.

Using data processing system 400 of FIG. 4 as an example, a computer-implemented method for hybrid task assignment is presented. Processor unit 404 executes instructions causing a working node to crawl a particular application and to encounter a task. Processor 404 determines whether the task encountered is reserved, using a mapping function and in response to a determination the task encountered is not reserved, the task is handled by the working node using processor 404. In response to a determination the task encountered is reserved, the task encountered is sent to a central unit by processor 404. In response to a determination the working node is idle, another task is requested from the central unit by the working node using processor 404 and in response to a determination the working node is not idle, determining whether all tasks are complete by processor 404 and in response to a determination all tasks are not complete, the working node handles the task using processor 404.

Figure 5:
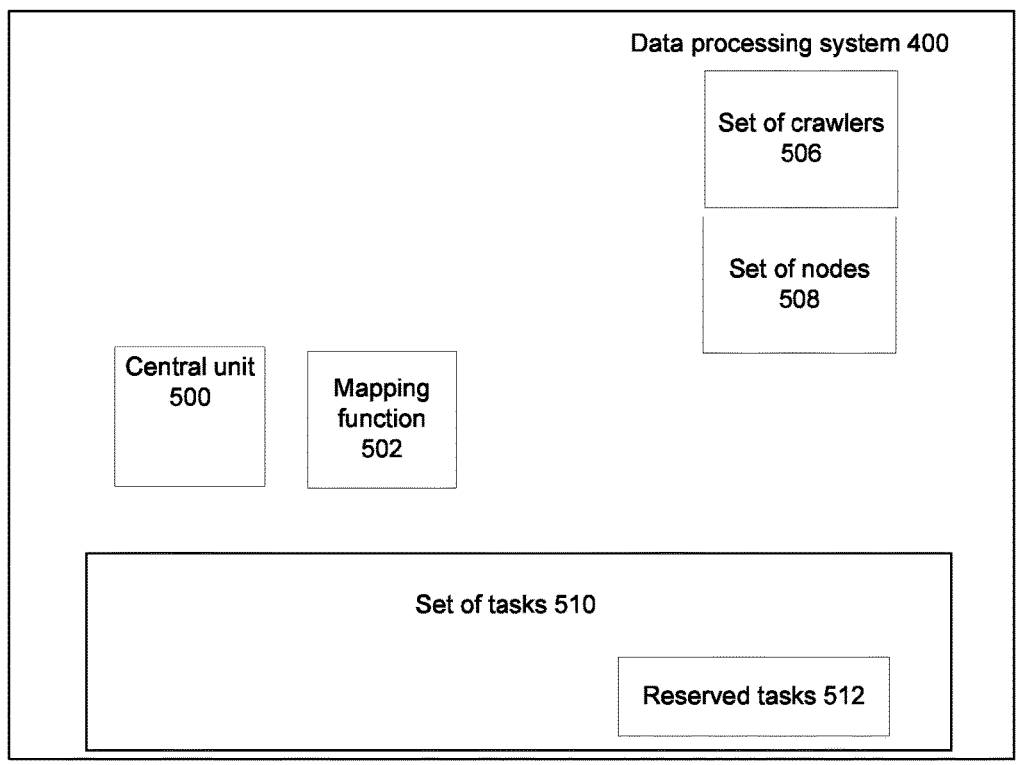
FIG. 5 is a block diagram of a hybrid assignment system operable for various embodiments of the disclosure.

With reference to FIG. 5 a block diagram of a hybrid assignment system operable for various embodiments of the disclosure is presented. Hybrid assignment system 316 is a representation of function components of an example embodiment of the disclosure. The example provided might be implemented using more or less components as needed by a particular implementation without loss of function described. For example, hybrid assignment system 316 may be provided as a single element within data processing system 400.

To obtain advantages of both a dynamic assignment model and a static assignment model a hybrid assignment model using functional aspects of both of a dynamic assignment model and static assignment model architectures is provided in an embodiment of hybrid assignment system 316.

Using the hybrid model worker nodes comprising set of nodes 508 continue crawling the applications using set of crawlers 506 and upon encountering a task they use mapping function 502 to identify a worker node from set of nodes 508 responsible to perform the task. Unlike the static assignment model however, mapping function 502 flags a subset of set of tasks 510 as reserved tasks 512. Reserved tasks 512 are not owned by any particular node and are forwarded to central unit 500 also referred to as a load balance server (or LBServer). Central unit 500 has a similar role as the centralized unit of the dynamic assignment model. All other tasks (not reserved tasks) are handled as in the static model in which working nodes execute the tasks.

When a worker node in set of nodes 508 becomes idle and has no more tasks to do, the worker node contacts central unit 500 and requests tasks. Central unit 500 assigns to the particular worker requesting tasks a number of the reserved tasks. In an embodiment of hybrid assignment system 316 a portion of tasks declared to be reserved represents pre-knowledge of required load balancing through out the crawl evident in the selected mapping function 502.

At the core of the proposed architecture is a deterministic mapping function that maps a subset of tasks to be reserved. Before crawling starts, by set of nodes 508 a mapping function, such as mapping function 502 is specified. The mapping function specified distributes the load comprising a number of tasks between each worker node in set of nodes 508 and also the reserved pool comprising reserved tasks 512. Tasks in reserved tasks 512 do not belong to any specific node. Tasks of reserved tasks 512 are directly reported when discovered, by the worker nodes, to central unit 500.

Central unit 500 in turn tracks all discovered reserved tasks. For each task that is a reserved task, central unit 500 also keeps a flag that indicates whether the task has been performed.

The worker nodes of set of nodes 508 crawl the website using the static allocation methodology without load balancing. The worker nodes use mapping function 502 to send tasks that do not belong to the respective worker node to either central unit 500 (when the tasks are reserved) or to other worker nodes (when the tasks belong to the respective workers).

When a worker node finishes tasks assigned, the worker node contacts central unit 500 to request more work. When an idle node asks central unit 500 for work, central unit 500 returns a subset of the discovered reserved tasks and flags the discovered tasks as visited. Crawling terminates when none of the nodes have work to do, nor is a reserved task on central unit 500 not flagged as visited.

Figure 6:
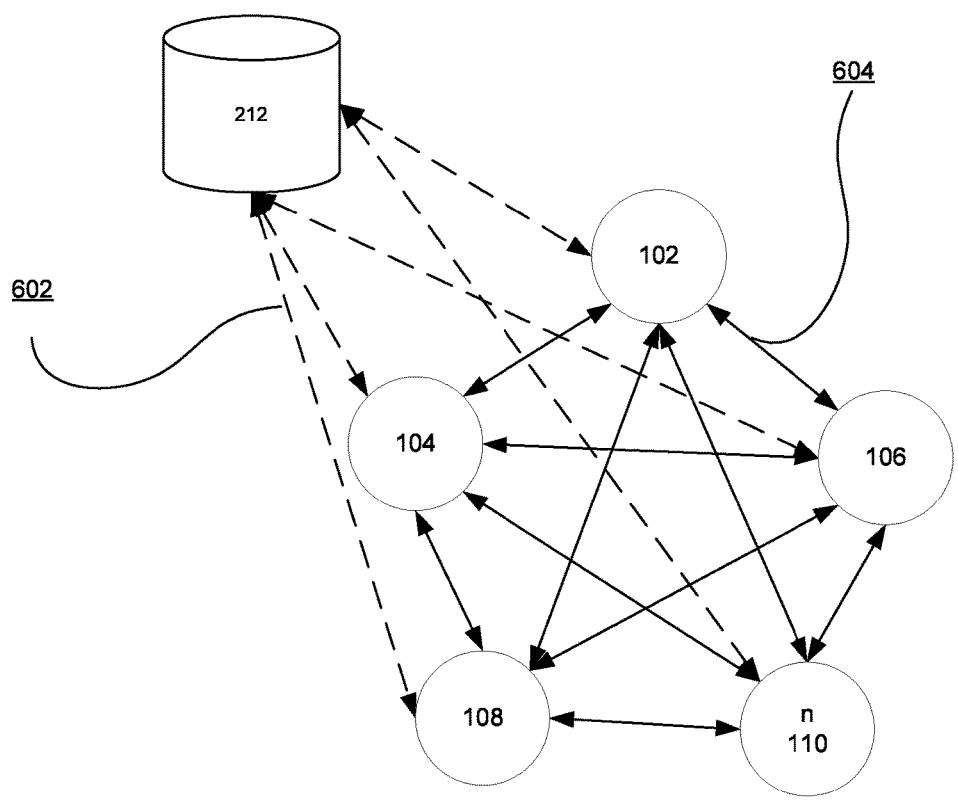
FIG. 6 is a data flow in a hybrid assignment model operable for various embodiments of the disclosure.

With reference to FIG. 6 a data flow in a hybrid assignment model operable for various embodiments of the disclosure is presented. Hybrid assignment system 600 is an example embodiment of hybrid assignment system 316 of FIG. 3. Although represented using a single central unit 212 and set of nodes 102-110 one skilled in the art can readily infer more than one central unit 212 and more than one set of nodes 102-110 may be incorporated into a load balancing and web crawling solution as a scale of operation requires without loss of function or departure from the disclosed process. Set of nodes 102-110 is shown with five nodes in the example but is not limited in the number of nodes supported.

Nodes 102-110 represent working nodes and central unit 212 represents a load balancing server. Solid arrows 604 represent notifications regarding non-reserved tasks among nodes 102-110. Dashed arrows 602 represent transfer of reserved tasks from nodes 102-110 to central unit 212 and from central unit 212 to nodes 102-110.

Figure 7:
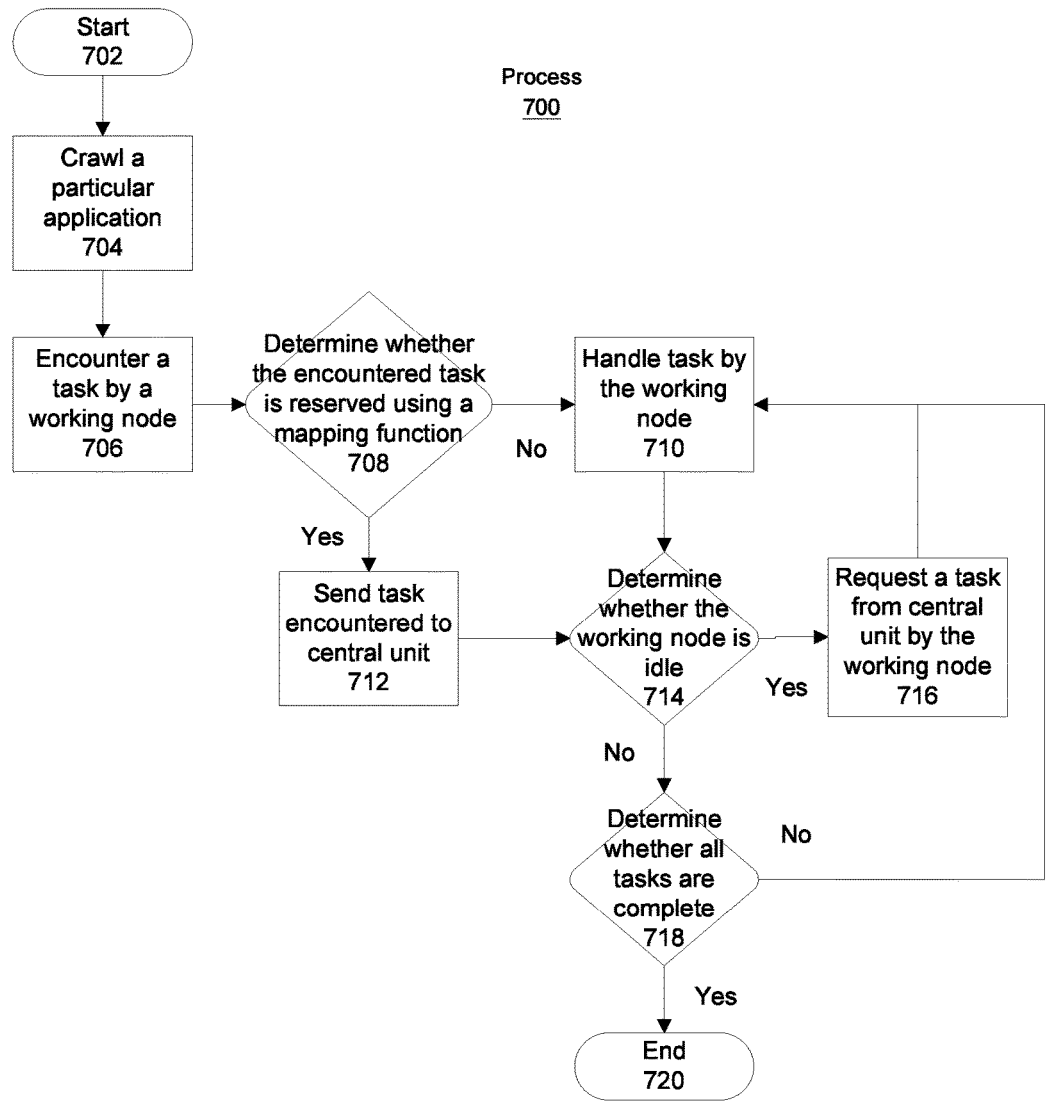
FIG. 7 is a high level flowchart of a hybrid assignment process operable for various embodiments of the disclosure.

With reference to FIG. 7 a high level flowchart of a hybrid assignment process operable for various embodiments of the disclosure is presented. Process 700 is an example of using hybrid assignment system 316 of FIG. 3.

Process 700 begins (step 702) and crawls a particular application (step 704). Process 700 encounters a task by a working node (step 706). Process 700 determines whether the encountered task is reserved using a mapping function (step 708).

In response to a determination the encountered task is not reserved, process 700 handles the task by the working node (step 710). In response to a determination the encountered task is reserved, process 700 sends the task encountered to a central unit (step 712). Process 700 determines whether the working node is idle (step 714).

In response to a determination the working node is idle, the working node in process 700 requests a task from the central unit by the working node (step 716) and returns to perform step 710 as before. In response to a determination the working node is not idle; process 700 determines whether all tasks are complete (step 718).

In response to a determination all tasks are not complete, process 700 returns to perform step 710 as before. In response to a determination all tasks are complete, process 700 terminates (step 720).

Figure 8:
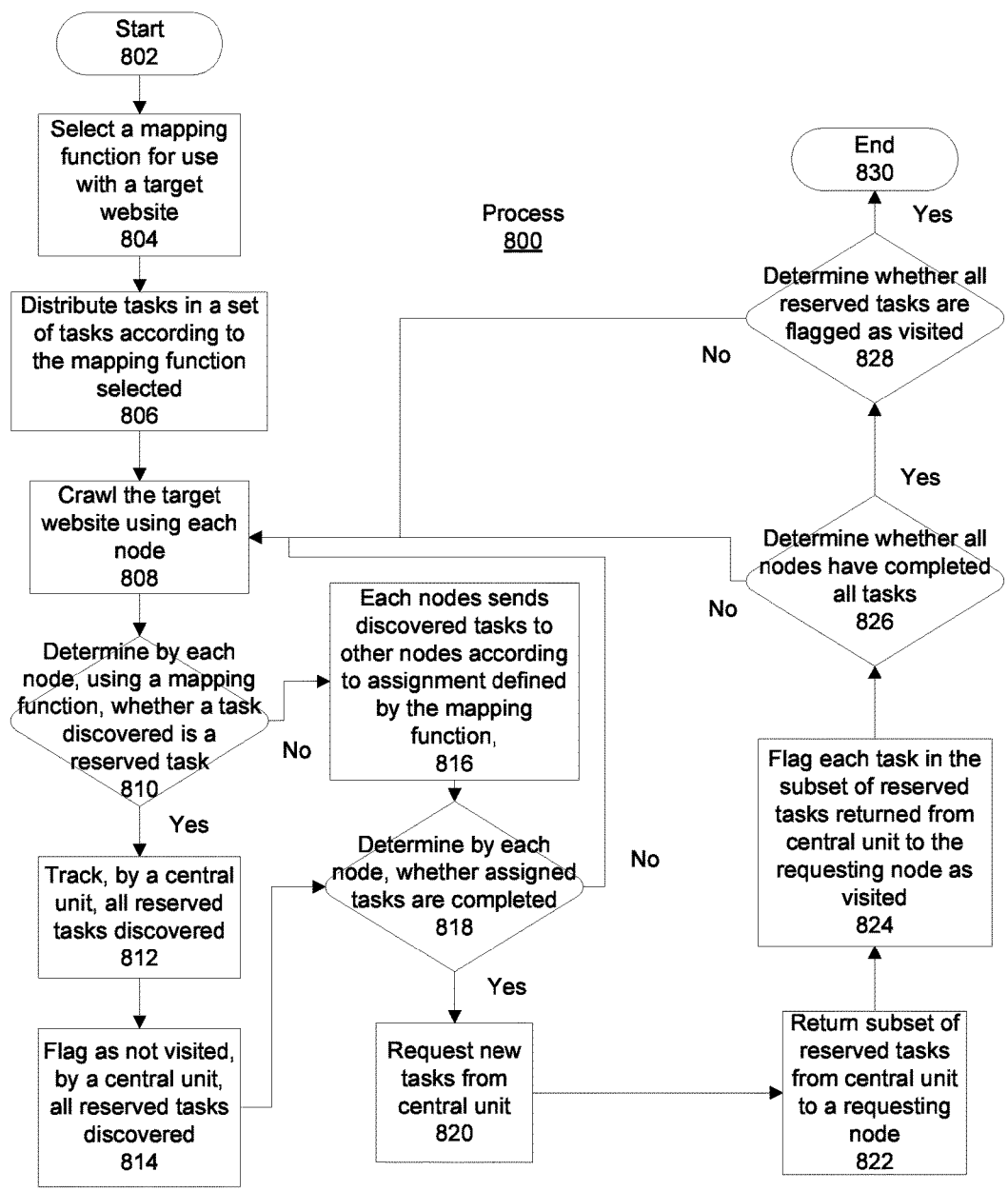
FIG. 8 is a flowchart of a hybrid assignment process operable for various embodiments of the disclosure.

With reference to FIG. 8 a flowchart of a hybrid assignment process operable for various embodiments of the disclosure is presented. Process 800 is an example of using hybrid assignment system 316 of FIG. 3.

Process 800 begins (step 802) and selects a mapping function for use with a target website (step 804). The mapping function chosen represents a particular distribution model or policy which assigns one or more tasks to respective working nodes and a set of reserved tasks to a central unit for management by the central unit for later distribution among the respective working nodes according to the mapping function selected. Process 800 distributes tasks in a set of tasks according to the mapping function selected (step 806). Process 800 initiates crawling the target website using each node (step 808). Each node in a set of nodes is assigned an initial number of tasks according to the mapping function used and assigned further tasks in accordance with the mapping function selected.

The portion of tasks allocated among the worker nodes and a reserved pool, as determined by the mapping function, is a crucial factor in dictating performance of process 800. In contrast, performing load balancing and transferring work among various nodes in a static assignment model can be very expensive. For example, using the static assignment model may require an idle node to find a busy node, which may require the idle node to contact multiple nodes (or not all), or keep a snapshot of an activity level for all other nodes. Upon finding a target busy node, the probing node has to contact the target and request the target node for work. At the end of this procedure the idle node may no longer be idle because other nodes may have discovered workload for previously idle node. Using process 800 individual workers do not initiate load balancing among nodes therefore eliminating a need to interrupt worker nodes to requests tasks, thereby reducing communication traffic among nodes.

Using process 800 each node determines, using the mapping function, whether a task discovered is a reserved task (step 810). In response to a determination the task discovered is a reserved task, process 800 tracks, by a central unit all reserved tracks discovered (step 812). Process 800 flags, by a central unit, as not visited all reserved tasks discovered (step 814). Process 800 moves to step 818.

Returning to step 810, in response to a determination the task discovered is not a reserved task, using process 800 each node sends discovered tasks to other nodes according to assignments defined by the mapping function (step 816). Process 800 determines, at each node, whether assigned tasks are completed (step 818).

In response to a determination assigned tasks are not completed, process 800 returns to perform step 808 as before. In response to a determination assigned tasks are completed, for a particular node, the particular node in process 800 requests new tasks from the central unit (step 820). The central unit of process 800 returns a subset of reserved tasks from the central unit to the requesting or particular node (step 822).

The central unit, in process 800, flags each task in the subset of reserved tasks returned from central unit to the requesting or particular node as visited (step 824).

The dynamic model uses one or more centralized control units to keep track of all tasks, and therefore the centralized units may become a bottleneck. Using the dynamic model, for each time a node discovers a task the discovering node sends a message to the one or more centralized control units. The message traffic adds an extra burden on the infrastructure due to the number of messages exchanged among workers and the control unit. In a worse case scenario every worker discovers every task and reports each discovery to the centralized control unit.

Using an embodiment of the disclosed hybrid assignment system as in process 800, a worst-case scenario occurs when every worker node discovers each task of a grouping of reserved tasks. However the number of reserved tasks is significantly less than the total number of tasks, and therefore the disclosed hybrid assignment system is typically more efficient than the traditional approaches.

Process 800 determines whether all nodes have completed all tasks (step 826). In response to a determination all nodes have not completed all tasks, process 800 returns to perform step 808 as before. In response to a determination all nodes have not completed all tasks, process 800 determines whether all reserved tasks are flagged as visited (step 828).

In response to a determination all reserved tasks are flagged as visited, process 800 terminates (step 830). In response to a determination all reserved tasks are not flagged as visited, process 800 returns to perform step 808 as before.

The two traditional approaches of static assignment and dynamic assignment accordingly represent two extremes used in embodiments of the hybrid assignment system as disclosed. The static assignment represents an embodiment of the hybrid assignment system in which the selected mapping function does not allocate any task to be a reserved task. The dynamic assignment model represents an embodiment of the hybrid assignment system in which the mapping function considers all discovered tasks to be reserved.

Thus is presented in an illustrative embodiment a computer-implemented method for hybrid task assignment. The computer-implemented method initiates a crawl of a particular application, by one or more working nodes and the working node encounters one or more tasks. Whether the tasks encountered are reserved is determined, using a mapping function. In response to a determination a task encountered is not reserved, the task is handled by one of the working nodes and in response to a determination the task encountered is reserved, the task encountered is sent to a central unit.

Whether the working node is idle is determined and in response to a determination the working node is idle, a task is requested from the central unit by the working node. And in response to a determination the working node is not idle, whether all tasks are complete is determined and in response to a determination all tasks are not complete, the working node handles the task.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code may include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

An illustrative embodiment of a computer-implemented method for hybrid task assignment initiates a crawl of a particular application, by a working node and encounters a task by the working node. Whether the task encountered is reserved is determined, using a mapping function and in response to a determination the task encountered is not reserved, the task is handled by the working node. In response to a determination the task encountered is reserved, the task encountered is sent to a central unit. In response to a determination the working node is idle, another task is requested from the central unit by the working node and in response to a determination the working node is not idle, whether all tasks are complete is determined and in response to a determination all tasks are not complete, the working node handles the task.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for hybrid task assignment, the computer-implemented method comprising:
crawling, by a working hardware node, a particular application;
encountering, by the working hardware node, a task in the particular application, wherein the task is from all multiple tasks required by the particular application;
using a mapping function to determine, by one or more processors, whether the task encountered is reserved, wherein an encountered reserved task is not owned by any particular node, wherein the encountered reserved task during said crawling of the particular application is forwarded to a central unit for distribution to one or more nodes for execution of the encountered reserve task, wherein the mapping function is specified before the crawling the particular application starts, wherein the encountered reserved task is from a set of multiple reserved tasks, and wherein the set of multiple reserved tasks is less than said all multiple tasks required by the particular application; and
selectively handling, by one or more processors, the task encountered according to whether the task encountered is an encountered reserved task, wherein in response to a determination the task encountered is not reserved, the working hardware node sends the task encountered directly to other working nodes according to assignments defined by the mapping function, and wherein in response to determining that the task encountered is an encountered reserved task, the task encountered is sent to the central unit, wherein the central unit is a load balance server that selectively sends the encountered reserved task to one or more of the other working nodes;
determining, by one or more processors, whether the working hardware node is idle and has no more tasks to perform;
selectively responding to whether the working hardware node is idle, wherein in response to determining that the working hardware node is idle, requesting, by one or more processors, another task from the central unit by the working hardware node, and wherein in response to determining that the working hardware node is not idle, determining whether all tasks are complete; and
in response to determining that all tasks are not complete, handling the task by the working hardware node.

2. The computer-implemented method of claim 1, wherein said crawling, by the working hardware node, the particular application comprises:
selecting the mapping function for use with a target application;
distributing tasks in a set of tasks according to the mapping function selected; and
crawling the target application using each node.

3. The computer-implemented method of claim 1, wherein sending the task encountered to the central unit comprises:
sending, from the working hardware node to the central unit, all tasks received by the working hardware node;
tracking, by the central unit, all reserved tasks discovered from said all tasks received by the working hardware node; and
flagging as "not visited", by the central unit, all reserved tasks discovered and flagging as "visited", by the central unit, all other discovered tasks in the particular application.

4. The computer-implemented method of claim 1, wherein handling the task by the working hardware node comprises:
sending discovered tasks to other nodes according to assignments using the mapping function selected.

5. The computer-implemented method of claim 1, wherein requesting a task from the central unit by the working hardware node comprises:
receiving the task from the central unit by the working hardware node, wherein a subset of reserved tasks is returned from the central unit to a requesting node.

6. The computer-implemented method of claim 5, wherein the central unit flags each task in the subset of reserved tasks, returned from the central unit to the requesting node, as visited.

7. The computer-implemented method of claim 2, wherein the mapping function selected distributes a load between each working node in a set of nodes and also a reserved pool of tasks.

8. A computer program product for hybrid task assignment, the computer program product comprising a computer readable storage medium having program code embodied therewith, wherein the computer readable storage medium is not a transitory signal per se, and wherein the program code is readable and executable by a processor to perform a method comprising:
crawling a particular application, by a working node;
encountering a task by the working node, wherein the task is from all multiple tasks required by the particular application;
determining whether the task encountered is reserved by using a mapping function, wherein an encountered reserved task is not owned by any particular node, wherein the encountered reserved task during said crawling of the particular application is forwarded to a central unit for distribution to one or more nodes for execution of the encountered reserve task, wherein the mapping function is specified before the crawling the particular application starts, wherein the reserved task is from a set of multiple reserved tasks, and wherein the set of multiple reserved tasks is less than said all multiple tasks required by the particular application;
selectively handling the task encountered according to whether the task encountered is an encountered reserved task, wherein in response to a determination the task encountered is not reserved, the working node sends the task encountered directly to other working nodes according to assignments defined by the mapping function, and wherein in response to determining that the task encountered is an encountered reserved task, the task encountered is sent to the central unit, wherein the central unit is a load balance server that selectively sends the encountered reserved task to one or more of the other working nodes;
determining whether the working node is idle and has no more tasks to perform;
selectively responding to whether the working node is idle, wherein in response to determining that the working node is idle, requesting another task from the central unit by the working node, and wherein in response to determining that the working node is not idle, determining whether all tasks are complete; and in response to determining that all tasks are not complete, handling the task by the working node.

9. The computer program product of claim 8, wherein the method further comprises:
selecting the mapping function for use with a target application;
distributing tasks in a set of tasks according to the mapping function selected; and
crawling the target application using each node.

10. The computer program product of claim 8, wherein the method further comprises:
tracking, by the central unit, all reserved tasks discovered; and
flagging as not visited, by the central unit, all reserved tasks discovered.

11. The computer program product of claim 8, wherein the method further comprises:
sending discovered tasks to other nodes according to assignments using the mapping function selected.

12. The computer program product of claim 8, wherein the method further comprises:
receiving the task from the central unit by the working node wherein a subset of reserved tasks is returned from the central unit to a requesting node.

13. The computer-implemented method of claim 1, further comprising:
determining, by one or more processors, a size of the set of multiple reserved tasks based on a pre-knowledge of required load balancing among working nodes used throughout said crawling of the particular application.

14. The computer program product of claim 9, wherein the mapping function selected distributes the load between each worker node in a set of nodes and also a reserved pool of tasks.

15. An apparatus for hybrid task assignment, the apparatus comprising:
a communications fabric;
a memory connected to the communications fabric, wherein the memory contains computer executable program code;
a communications unit connected to the communications fabric;
an input/output unit connected to the communications fabric;
a display connected to the communications fabric; and
a processor unit connected to the communications fabric, wherein the processor unit executes the computer executable program code to direct the apparatus to:
crawl a particular application, by a working node;
encounter a task by the working node, wherein the task is from all multiple tasks required by the particular application;
determine whether the task encountered is reserved by using a mapping function wherein an encountered reserved task is not owned by any particular node, wherein the encountered reserved task during said crawling of the particular application is forwarded to a central unit for distribution to one or more nodes for execution of the encountered reserve task, wherein the mapping function is specified before the crawling the particular application starts, wherein the reserved task is from a set of multiple reserved tasks, and wherein the set of multiple reserved tasks is less than said all multiple tasks required by the particular application;
selectively handle the task encountered according to whether the task encountered is an encountered reserved task, wherein in response to a determination the task encountered is not reserved, send the task encountered directly to other working nodes according to assignments defined by the mapping function, and wherein in response to determining that the task encountered is an encountered reserved task, send the task encountered to the central unit, wherein the central unit is a load balance server that selectively sends the encountered reserved task to one or more of the other working nodes;
determine whether the working node is idle and has no more tasks to perform;
selectively respond to whether the working node is idle, wherein in response to determining that the working node is idle, request another task from the central unit, and wherein in response to determining that the working node is not idle, direct the apparatus to determining whether all tasks are complete; and
in response to determining that all tasks are not complete, handle the task by the working node.

16. The computer-implemented method of claim 1, wherein the working hardware node and the other working nodes make up a set of working nodes used to execute the tasks for the particular application, and wherein computer-implemented method further comprises:
setting, by one or more processors, a quantity of reserved tasks based on the mapping function used; and
determining, by one or more processors, a required load balancing among the set of working nodes based on the quantity of reserved tasks.

17. The computer-implemented method of claim 1, wherein the working hardware node and the other working nodes make up a set of working nodes used to execute the tasks for the particular application, and wherein computer-implemented method further comprises:
assigning, by one or more processors, an initial number of tasks to each node in the set of working nodes according to the mapping function that is used.

18. The computer-implemented method of claim 1, further comprising:
in response to determining that all tasks for the working hardware node are complete, requesting, by the working hardware node, a new task from the central unit.

19. The apparatus of claim 18, wherein the processor unit executes the computer executable program code to direct the central unit to flag each task in a subset of reserved tasks, returned from the central unit to the requesting node, as visited.

* * * * *